US009459776B1

(12) United States Patent
Miller

(10) Patent No.: US 9,459,776 B1
(45) Date of Patent: Oct. 4, 2016

(54) DEVICE FOR USE IN STUDIES INVOLVING MULTIPLE SUBJECTS TO RECORD OBSERVATION DATA IN AN OUTPUT FILE

(71) Applicant: U.S. Army Research Development and Engineering Command, Washington, DC (US)

(72) Inventor: Dennis B. Miller, Rising Sun, MD (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 579 days.

(21) Appl. No.: 13/799,782

(22) Filed: Mar. 13, 2013

(51) Int. Cl.
*G06F 1/12* (2006.01)
*G06F 3/0484* (2013.01)

(52) U.S. Cl.
CPC ............ *G06F 3/04842* (2013.01); *G06F 1/12* (2013.01)

(58) Field of Classification Search
CPC .. G06F 3/0484; G06F 3/04847; G06F 17/18; G06F 19/26; G06F 19/28; G06F 19/708; G06F 1/12; G09B 23/28
USPC ............... 715/203, 233, 764; 345/619, 672; 702/179; 700/83
See application file for complete search history.

(56) References Cited

U.S. PATENT DOCUMENTS

| | | | |
|---|---|---|---|
| 2001/0009976 A1* | 7/2001 | Panescu et al. | 600/424 |
| 2002/0024540 A1* | 2/2002 | McCarthy | 345/844 |
| 2007/0188319 A1* | 8/2007 | Upton | 340/539.13 |
| 2010/0152544 A1* | 6/2010 | Weaver et al. | 600/300 |
| 2012/0215075 A1* | 8/2012 | Surace et al. | 600/301 |
| 2013/0002599 A1* | 1/2013 | Townsley et al. | 345/174 |
| 2013/0073997 A1* | 3/2013 | Brian et al. | 715/772 |

OTHER PUBLICATIONS

JP 2009-187417 A, English MT, published on Aug. 20, 2009.*

* cited by examiner

*Primary Examiner* — Jeffrey A Gaffin
*Assistant Examiner* — Rinna Yi
(74) *Attorney, Agent, or Firm* — Ulysses John Biffoni

(57) ABSTRACT

A device for use in studies involving multiple subjects to record observation data in an output file is provided. The invention may be embodied in a tablet type computer having a touchscreen or another form of electronic device having user input capability. The device displays a set of subject buttons for selecting a subject for which observation data will be recorded, a corresponding set of start time buttons to track and display the elapsed time for the corresponding subject, and a set of observation buttons corresponding to pre-defined observation data established by the user. Additional features may include, among other features, a reminder function for setting user-defined alarms, a time-stamped note function, and an initiation function for items such as time synchronization, describing subjects, and describing environmental or exposure details for the study to be performed.

5 Claims, 7 Drawing Sheets

DEVICE FOR USE IN STUDIES INVOLVING MULTIPLE SUBJECTS TO RECORD OBSERVATION DATA IN AN OUTPUT FILE

GOVERNMENT INTEREST

The present invention may be manufactured, used, and/or licensed by or for the United States Government.

BACKGROUND

1. Technical Field

The present invention relates generally to a device for entering data using a graphical user interface and a pointing device such as a touchpad, touchscreen, mouse, trackball or voice command, and, more particularly, to such a device for use in studies or experiments involving the observation of multiple subjects.

2. Description of the Related Art

Research studies or experiments in various scientific disciplines require the observation of a plurality of subjects where accurate observation data must be recorded by the person or people conducting the study. That is, the people conducting these studies watch the subjects and record observations as they occur during the study. The subjects in these studies can be animals or humans, and the environment for the study may be a laboratory setting, a natural environment, or some combination thereof. The purpose of these studies may be diverse as well, from toxicological studies using animal models such as mice to evaluate the toxicity of drugs to human behavioral studies used for market research or human performance analysis. For whatever purpose the study is undertaken, the utilization of a plurality of subjects at any one time or experimental run is both time and resource efficient, but creates challenges in the accuracy and consistency of the recorded observation data. False, inaccurate, or inconsistent data compromises the validity of the study and is highly undesirable. Prior art means of recording such data generally consist of hand writing notes in a log book or a paper form, or entering such information into the digital equivalent of a log book or form by typing the information using a keyboard.

Accordingly, there is a need for a device to enter data using a graphical user interface and a pointing device that will enable the recording of thorough, accurate, and precise observation data in real time during studies involving multiple subjects.

SUMMARY

In view of the foregoing, an exemplary embodiment of a device for use in studies involving multiple subjects to record observation data in an output file is provided. The invention may be embodied in a tablet type computer having a touchscreen or another form of electronic device having user input capability. The device displays a set of subject buttons or objects for selecting a subject for which observation data will be recorded through use of a pointing device, a corresponding set of start time buttons to track and display the elapsed time for the corresponding subject, and a set of observation buttons corresponding to pre-defined observation data established by the user. The subject buttons have an ON or OFF condition such that user selection of a subject button using the pointing device turns that button to the ON condition and turns all other subject buttons to the OFF condition. When an observation button is selected using the pointing device the pre-defined observation data associated with that observation button and the elapsed time associated with the subject for which the subject button is in the ON condition are recorded in an output file. In this way, thorough, accurate, and precise observation data can be recorded in real time during studies involving multiple subjects. Additional features may include, among other features, a reminder function for setting user-defined alarms, a time-stamped note function, and an initiation function for items such as time synchronization, describing subjects, and describing environmental or exposure details for the study to be performed.

These and other aspects of the embodiment herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the present invention includes all such modifications.

DETAILED DESCRIPTION

The embodiments herein and the various features and advantageous details thereof are explained more fully with reference to a non-limiting embodiment that is illustrated in the accompanying drawings and detailed in the following description. Descriptions of well-known components and processing techniques are omitted so as to not unnecessarily obscure the embodiment herein. The examples used herein are intended merely to facilitate an understanding of ways in which the embodiment herein may be practiced and to further enable those of skill in the art to practice the present invention. Accordingly, the examples should not be construed as limiting the scope of the present invention.

The present invention is taught herein using visual depictions and descriptions of object-oriented programming. Objects are described by their properties and function and are also referred to herein as "buttons" or "button" of a graphic user interface. The art of object-oriented programming is well known and various software tools, such as that sold under the trademark LabVIEW, may be used to create and practice the subject invention as taught herein. Accordingly, those with ordinary skill in the art to which the invention applies will fully understand the following description and will thus be enabled to create and utilize the present invention with the teachings provided herein.

Figure 1:
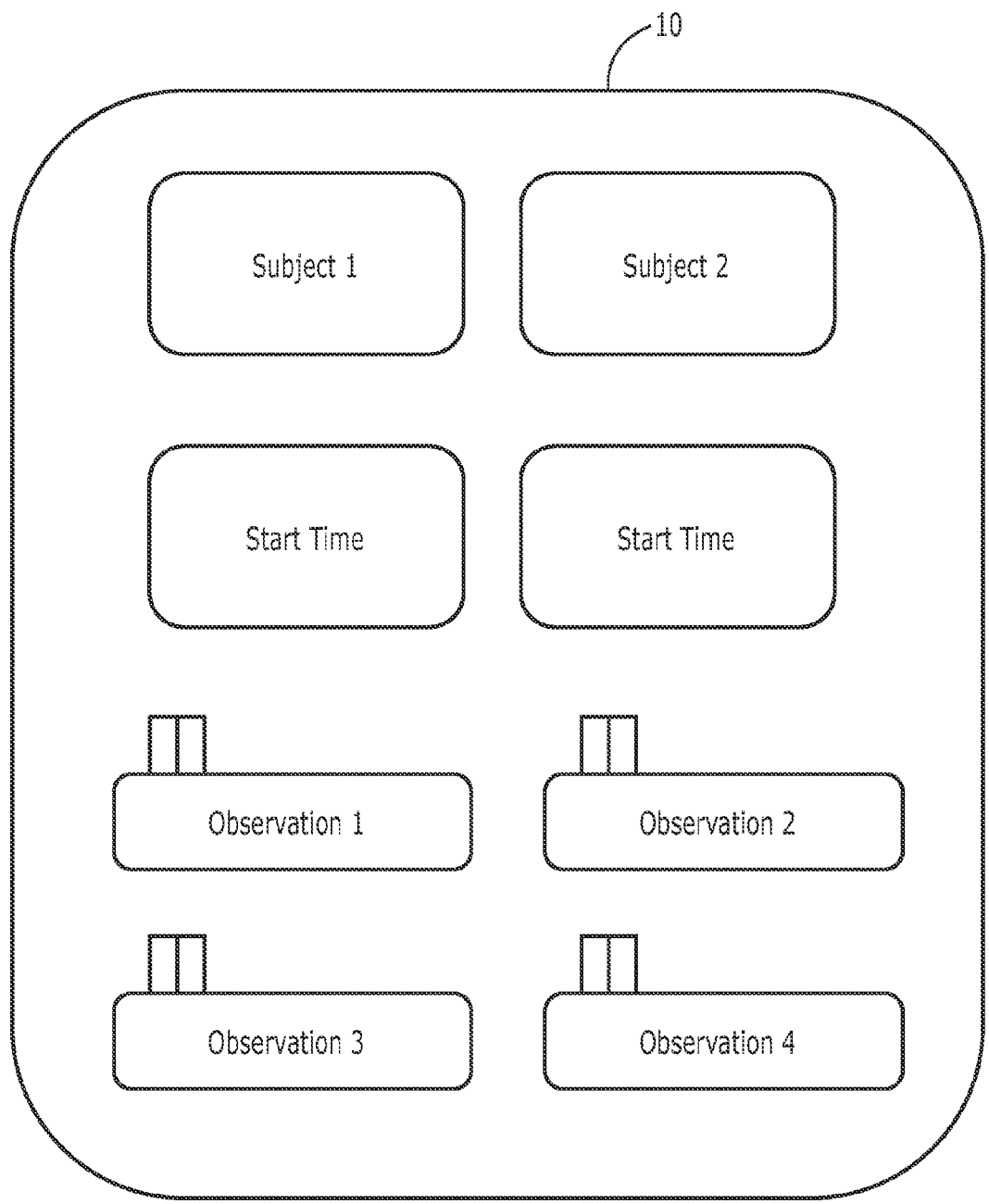
FIG. 1 is a graphical user interface illustrating an exemplary embodiment of the present invention before starting a study or experiment.

Turning to FIG. 1, a graphical user interface 10 illustrating an exemplary embodiment of the present invention before starting a study or experiment is provided. The graphical user interface 10 may be the screen of a tablet or laptop computer, another type of portable or handheld electronic device such as a smart phone, the monitor of a desktop computer, or any other means of practicing the object-oriented programming functional aspects of the invention as taught herein. A selection means or pointing device (not shown) is used in conjunction with graphical user interface 10 to allow the user to select one of the buttons or objects. The function, appearance, and arrangement of the objects within graphical user interface 10 provide the desired utility as will be described below in reference to a sequence of screen captures at different times in a study or experiment.

The term "user input to the device via a selection mechanism" as used herein refers to the use of a pointing device that allows a user to input data with physical gestures, such as pointing and clicking, or with voice commands. Movements of the pointing device are echoed within graphical user interface 10 by a corresponding movement of a pointer or cursor, or are indicated by other visual changes on the screen such as a change in the color of a button to denote its selection. Pointing devices that may be used with the present invention include but are not limited to a mouse, trackball, joystick, touchpad, touchscreen, stylus, foot-mouse, finger-mouse, gyroscopic mouse, game remote, light pen, eye tracking device, and voice command device.

Returning to FIG. 1, the plurality of subject buttons within graphical user interface 10 provides a means for selecting a subject for which observation data will be recorded. The subject buttons have an ON condition and an OFF condition responsive to a user input to the device via a selection mechanism or pointing device such that when a subject button is selected it is set to the ON condition and all other subject buttons are set to the OFF condition.

The plurality of start time buttons within graphical user interface 10 provides a means for starting the clock associated with the corresponding subject button. The start time buttons are also used to display the elapsed time since selecting the start time button.

A plurality of observation buttons corresponding to pre-defined observation data are also provided within graphical user interface 10. As will be more fully described and illustrated below, selection of an observation button by the user input to the device via a selection mechanism or pointing device causes the observation button thus selected to record in an output file the pre-defined observation data associated with the observation button thus selected and the elapsed time when the observation button was selected as measured by the time start button associated with the subject button in the ON condition. In this way, precise and accurate observation data with time stamps are recorded in an output file for subsequent use in analyzing the study or experimental results.

Figure 2:
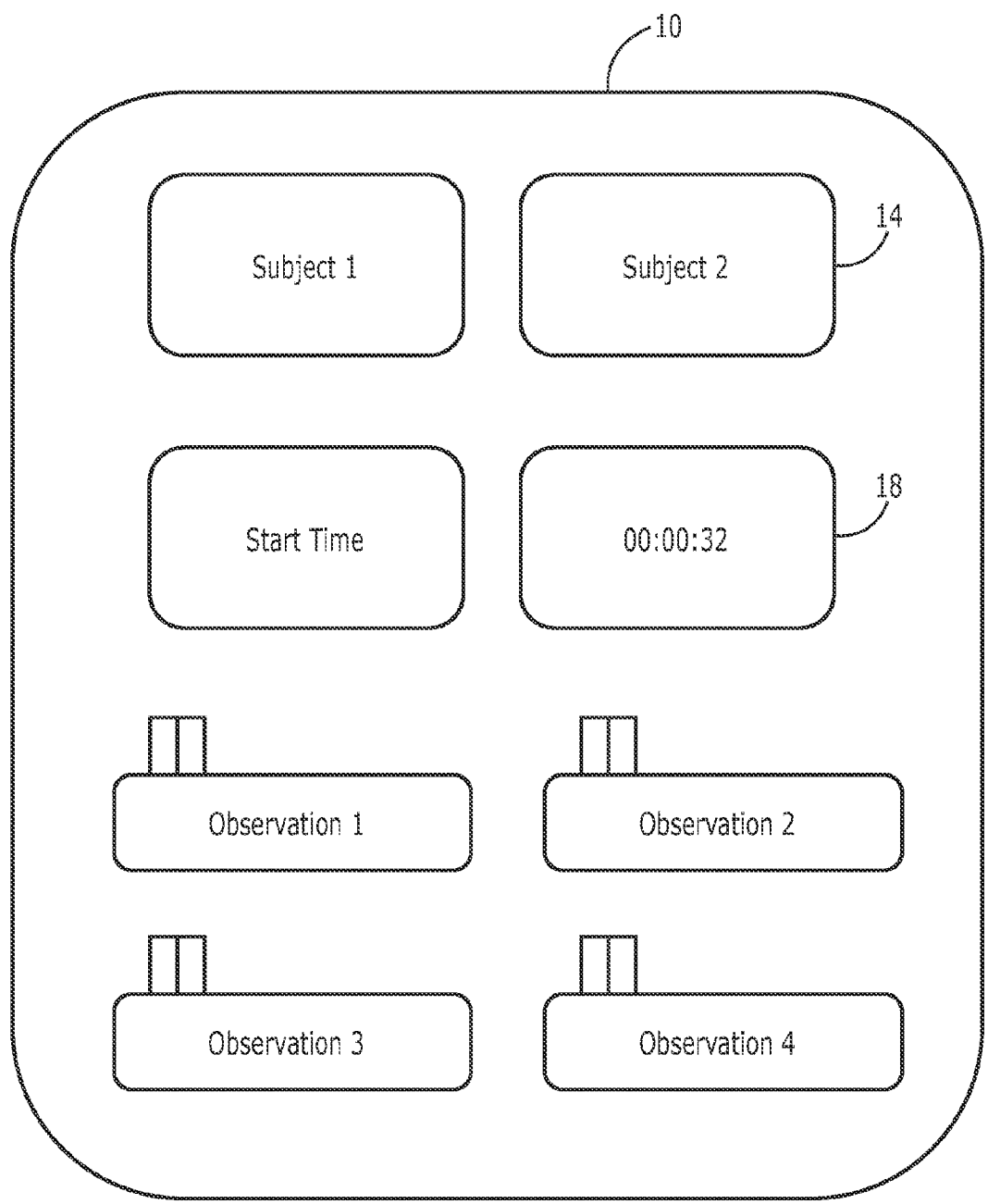
FIG. 2 is a graphical user interface illustrating an exemplary embodiment of the present invention with the study or experiment having started for one subject.

Turning to FIG. 2, the graphical user interface 10 illustrating an exemplary embodiment of the present invention is shown with the study or experiment having started for one subject. A subject button 14, which is labeled in this example as "Subject 2" has an associated start time button 18, which in this depiction reads a time of 00:00:32, corresponding to 32 seconds of elapsed time for Subject 2. That is, the start or beginning time of the study or experiment for Subject 2 occurred precisely 32 seconds prior to the screen capture illustrated in FIG. 2. The start time, as illustrated here for Subject 2, commences when the user selects or activates the start time button, in this example start time button 18. This may be done using the various pointing devices or selection methods already described. The arrangement of subject button 14 and start time button 18 in relation to each other and the other buttons on graphic user interface 10 can be designed as illustrated herein to make it easy for the user to quickly note the elapsed study or experiment time for a given subject. This reduces the chance of a human error. In addition, the plurality of start time buttons, each associated with a single subject, aids the user in performance of the study or experiment having multiple subjects by allowing a quick comparison of the elapsed times across subjects. For example, if the user forgets to commence the study for one of the subjects, or is late in doing so, it will be readily apparent on graphical user interface 10.

Figure 3:
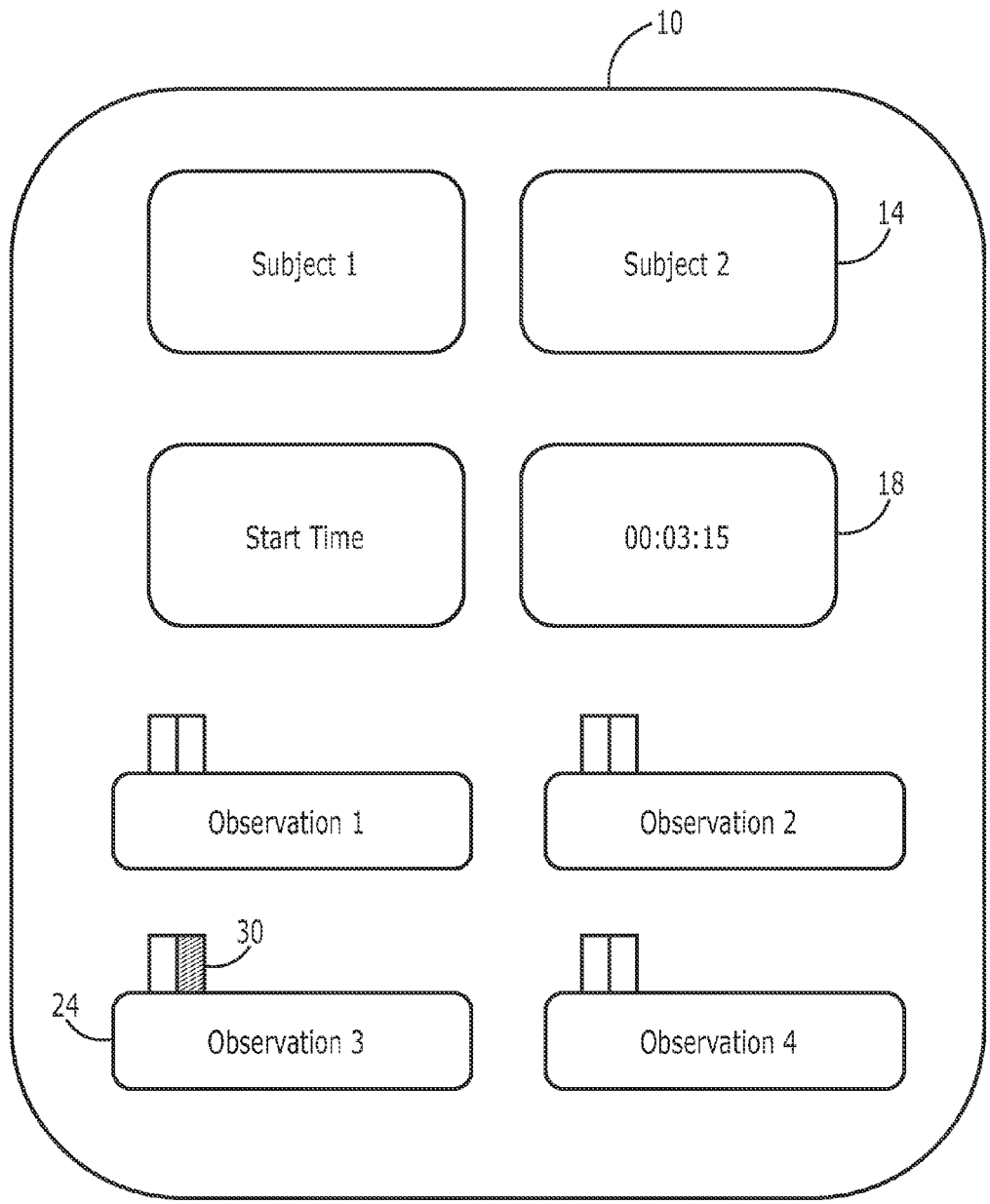
FIG. 3 is a graphical user interface illustrating an exemplary embodiment of the present invention with the study or experiment having started for one subject and with one observation recorded for that subject.

Turning to FIG. 3, the graphical user interface 10 illustrating an exemplary embodiment of the present invention is shown with the study or experiment having started for one subject and with one observation recorded for that subject as represented by status indictor bar 30. The elapsed time for Subject 2 as provided by start time button 18 is now 00:03:15 in FIG. 3, corresponding to 3 minutes and 15 seconds of elapsed time for Subject 2. During the time period between the screen captures illustrated in FIG. 2 and FIG. 3, the user recorded what is labeled in this example as "Observation 3" by selecting or pressing observation button 24 with subject button 14 in the ON condition. That is, the user selected subject button 14 to place it in the ON condition and all other subject buttons in the OFF condition. With the subject buttons as described, the user then selected observation button 24. The selection of observation button 24 with subject button 14 in the ON condition caused status indictor bar 30 to turn to the ON condition, indicating that an Observation 3 has been recorded for Subject 2, and caused data to be recorded in an output file. The data recorded by such action includes a pre-defined observation description or similar observation data associated with the observation button 24 thus selected and the elapsed time when the observation button was selected as measured by the time start button 18 associated with the subject button 14 in the ON condition. The pre-defined observation description or similar observation data associated with the observation button 24 may, for example, be a text description of a symptom, sign, or behavior. In this way, precise observation data are recorded in the definition or description of the observation and the time at which it occurred or was observed is recorded as well.

Figure 4:
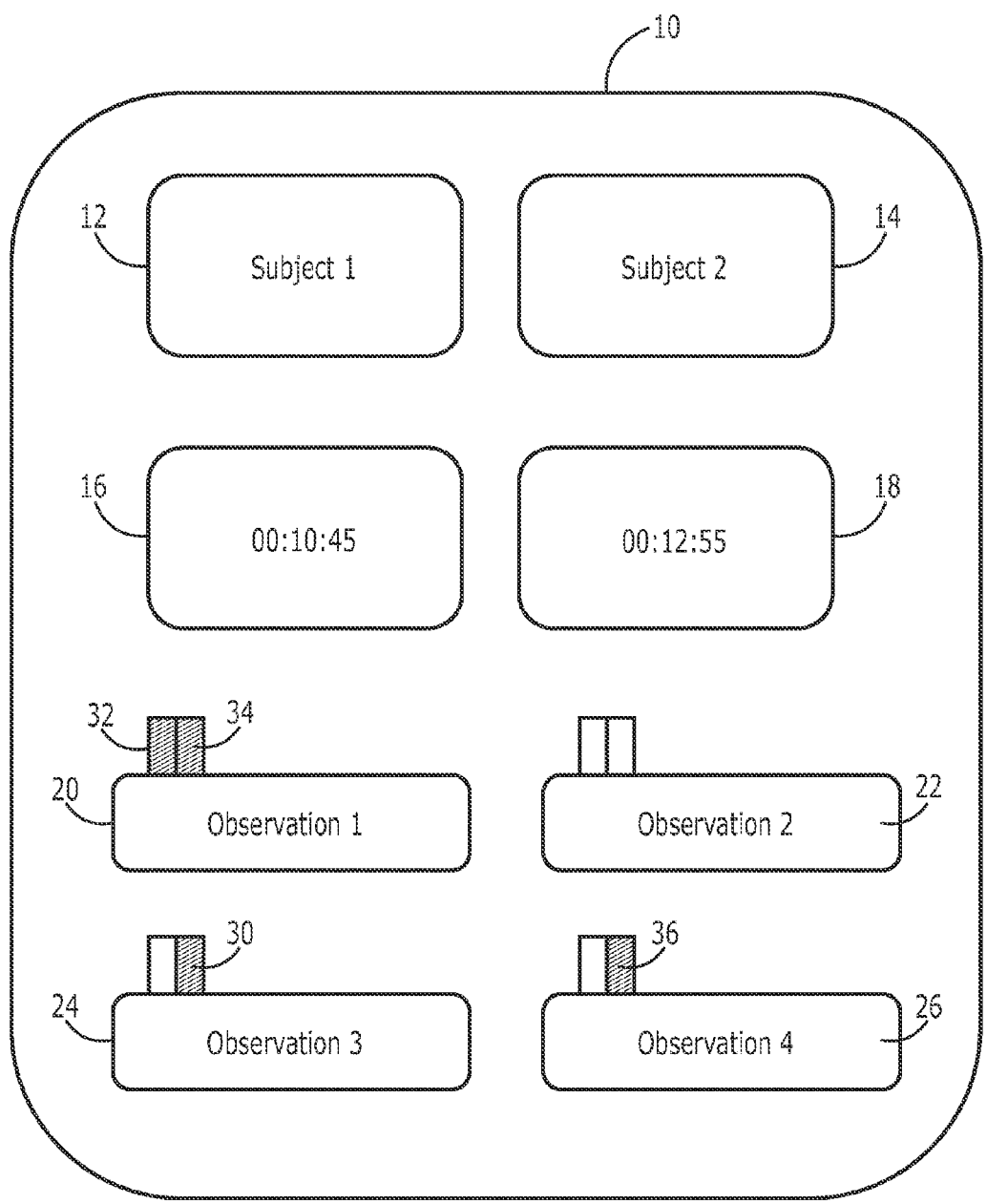
FIG. 4 is a graphical user interface illustrating an exemplary embodiment of the present invention with the study or experiment having started for two subjects and with three observations recorded for one subject and one observation recorded for the other subject.

Turning to FIG. 4, a graphical user interface 10 illustrating an exemplary embodiment of the present invention with the study or experiment having started for two subjects, represented by subject buttons 12 and 14, and with four combined observations recorded thus far as represented by status indictor bars 30, 32, 34, and 36. In this example, Subject 1 has an elapsed time of 10 minutes and 45 seconds as represented by start time button 16. Subject 2 has an elapsed time of 12 minutes and 55 seconds as represented by start time button 18. A user observation and recording of the event associated with observation button 20 has occurred for the subject represented by subject button 12. This is indicated by the ON condition of status indictor bar 32. The event associated with observation button 20 has also occurred for the subject represented by subject button 14 as illustrated by the ON condition of status indictor bar 34. Similarly, the event associated with observation button 24 has occurred for the subject corresponding to or represented by subject button 14, as illustrated by the ON condition of status indictor bar 30. The event associated with observation button 26 has also occurred for the subject corresponding to or represented by subject button 14, as illustrated by the ON condition of status indictor bar 36. The event associated with observation button 22 has not occurred for either subject.

As illustrated by FIGS. 1 through 4, the ease, precision, and accuracy of recording time-stamped observation data are enhanced by the present invention, particularly in experiments or studies involving simultaneous observation of multiple subjects.

Figure 5:
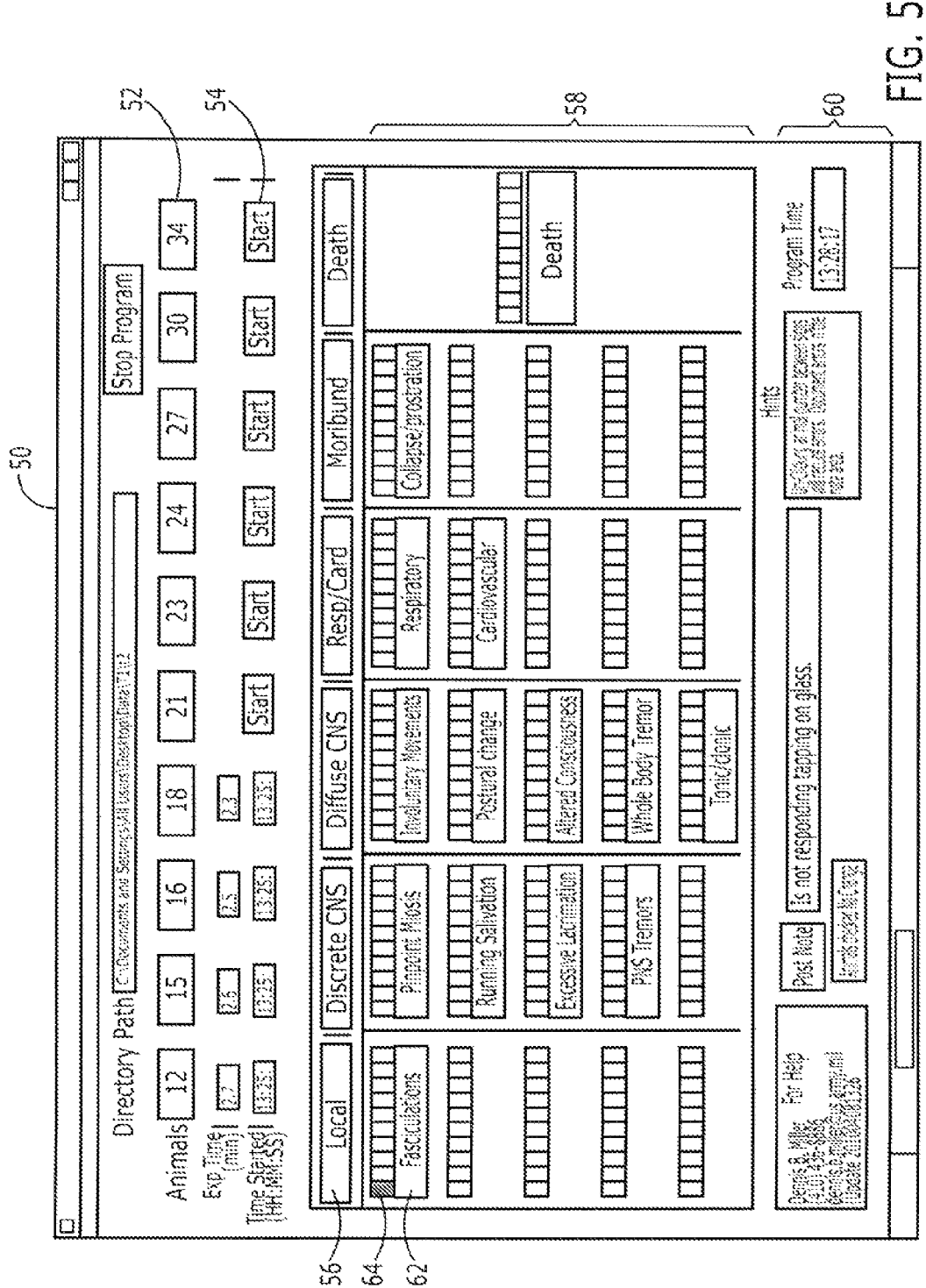
FIG. 5 a different graphical user interface illustrating another exemplary embodiment of the present invention in which additional features are illustrated.

Turning to FIG. 5 a different graphical user interface 50 illustrating another exemplary embodiment of the present invention in which additional features are illustrated is provided. In this example, a row of ten subject buttons 52 is provided in which the user has labeled these subject buttons with the subject number labels as shown. The numbers used happen to be non-sequential integers to represent animal subjects, but may be of any text or alphanumeric description desired by the user. A row of ten start time buttons 54 is provided such that each subject button has an associated start time button. That is, there is a one-to-one mapping of subject buttons to start time buttons as taught in this exemplary embodiment. Graphical user interface 50 also includes an array or matrix of observation buttons 58. In this exemplary embodiment, the array or matrix of observation buttons 58 are arranged in columns such that the observations are group by category. For example, column 56 corresponds to a user-defined category of "Local," which in this example refers to localized signs or symptoms as the result of an exposure to a toxic agent. In this example screen capture, an observation button 62 under the Local category 56 has been selected by the user. Status indictor bar 64 shows that the observation was recorded for the subject on the far left of subject row 52, labeled "12" as indicated by the corresponding location of status indictor bar 64. That is, the status indicator bars need not be labeled if they are provided in the same number and arrangement as the subject buttons 52. Again, this orientation and functionality of objects aids the user with ease and accuracy of reading the displayed data.

Also illustrated in FIG. 5 are additional features and information 60 that may be provided to the user by the present invention. Such additional features and information 60 may include a time-stamped post note function, a function to record a time-stamped event that the subjects were checked and no changes were noted, a program time clock, hints and help topics, or other desired features and functions. As with other aspects of the present invention, this feature may be customized by the user for a given study or experiment or for a set of studies or experiments.

Figure 6:
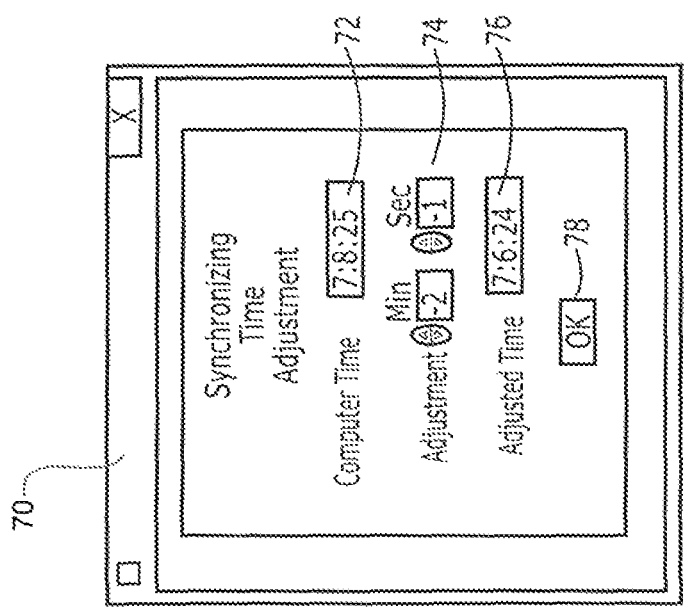
FIG. 6 a graphical user interface illustrating a time synchronization function of the present invention.

Turning to FIG. 6 a graphical user interface 70 illustrating a time synchronization function of the present invention is provided. This function may be used to make an adjustment, for the purposes of the time stamps to be generated, to the computer time 72 obtained from the hardware device on which the present invention is running. In this example, an adjustment input object 74 is provided for the user to indicate the amount of minutes and seconds to either add or subtract from computer time 72 when outputting the time stamps. The adjusted time 76 is displayed for user convenience and comparison with computer time 72. An acknowledgement or OK button 78 is provided to apply the change.

Figure 7:
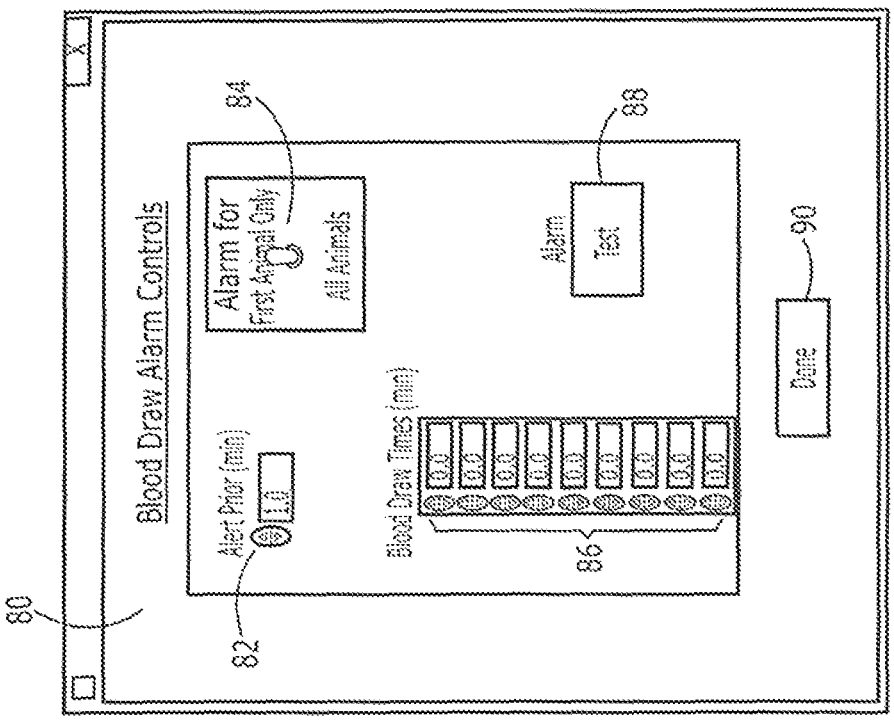
FIG. 7 a graphical user interface illustrating a reminder function of the present invention.

Turning to FIG. 7 a graphical user interface 80 illustrating a reminder function of the present invention is provided. In this example, the amount of time at which an alarm or reminder is activated before an event is to occur is set using object 82. A graphical representation of a toggle switch 84 is used in this example for the user to specify for the alarm to occur for just the first subject or for all subjects. In this particular example, the reminder part is used to ensure that blood draw times 86 are performed as scheduled in the protocol. Object 86 illustrates an effective input means for such data. Also provided in this example are an alarm test object 88 and acknowledge or done button 90.

Figure 8:
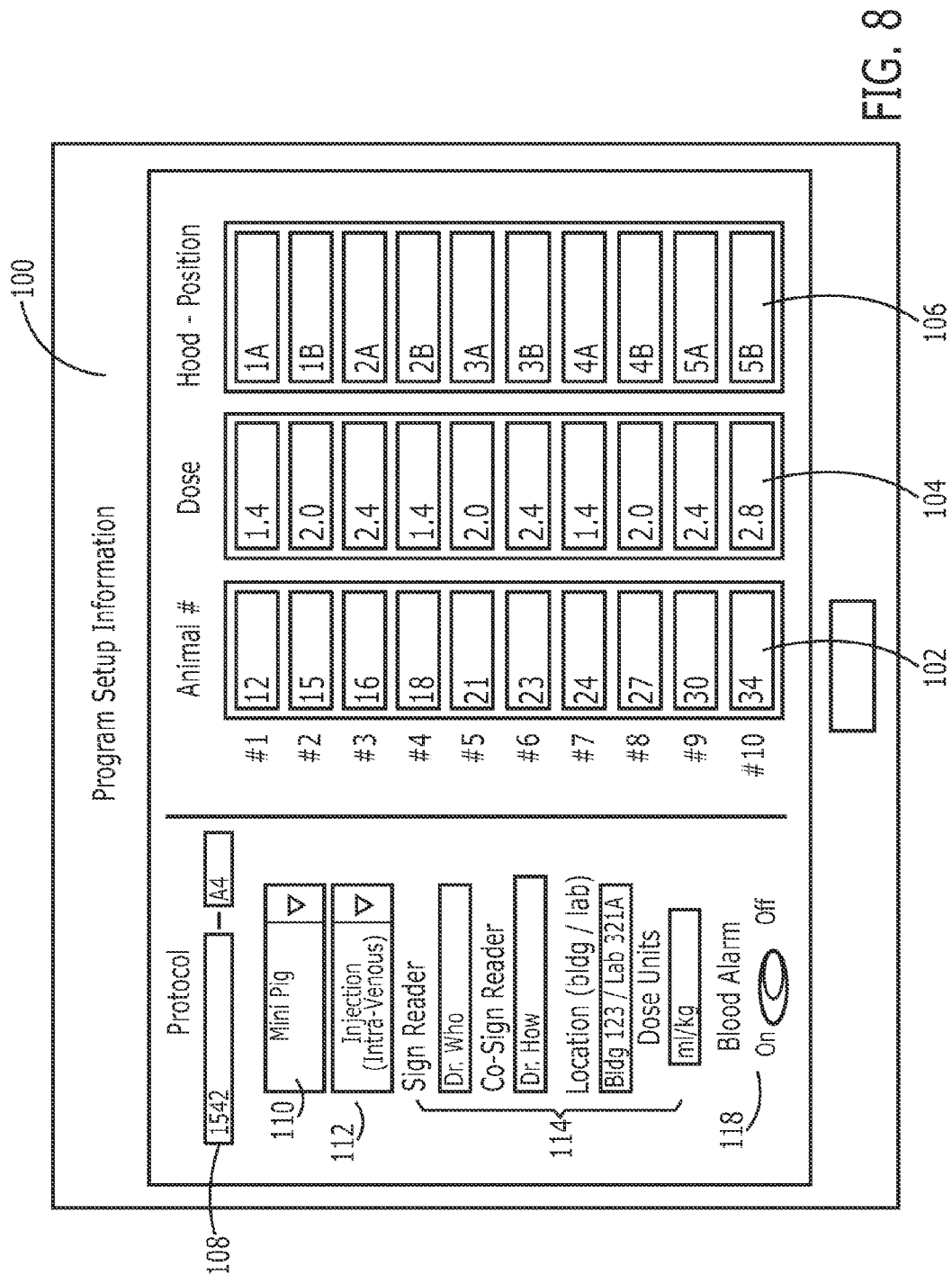
FIG. 8 is a graphical user interface illustrating an initiation function of the present invention.

Turning to FIG. 8, a graphical user interface 100 illustrating an initiation function of the present invention is provided. In this example, a protocol number can be entered via object 108. A subject identification drop-down menu is provided by object 110, which is labeled in the screen capture depicted as "Mini Pig." Similarly, a dose or exposure description is provided by the drop-down menu of object 112. Also provided in this illustration are additional documentation elements to be inputted via object 114 and an object 118 for turning the alarm/reminder to the ON or OFF condition as desired. In this initiation function or part of the graphical user interface 100, the user can assign the numbers or text 102 to appear in the subject buttons as well as other information associated with the subject, such as dose 104, and hood-position 106.

The output file produced by the present invention will typically include data from the initiation function to identify the experiment with information such as the protocol number, date, subject descriptions, and the like. The output file will also include the time-stamped observation data. The data in the output file may be recorded in a comma-delimitated format so that it can be read or imported into a spreadsheet program of the user's choice or another software program for post-experiment analysis.

While a specific exemplary embodiment of the invention has been described, it will be understood that additional embodiments and various modifications may be made without departing from the spirit and scope of the invention. The size, shape, and function of buttons or objects in the graphic user interface, for example, may vary for alternative embodiments. The hardware used to practice the invention may vary. That is, the graphical user interface of the present invention may be practiced using the screen of a tablet or laptop computer, another type of portable or handheld electronic device such as a smart phone, the monitor of a desktop computer, or any other means of practicing the object-oriented programming functional aspects of the invention as taught herein. Pointing or selection devices may include a wide range of choices, including but not limited to a touchpad, touchscreen, mouse, trackball, stylus, game controller, voice command device, or other pointing devices including those yet to be invented. The present invention may also include direct input leads from the subjects in addition to the user or observer input as taught herein. For example, such subject input could accommodate data feeds directly from the triggering of touch bars by animal subjects or the input of response data by human subjects via a remote interface in addition to the user or observer input as taught herein.

Accordingly, these and other embodiments of the invention fall within the scope of the claims below.

What is claimed is:

1. A device for use in studies involving multiple subjects to record observation data in an output file, comprising:

a display for displaying a plurality of subject buttons, start time buttons, and observation buttons within a graphical user interface;

the plurality of subject buttons for selecting a subject for which observation data will be recorded wherein said subject buttons have an ON condition and an OFF condition responsive to a user input to the device via a selection mechanism such that when a subject button is selected it is set to the ON condition and all other subject buttons are set to the OFF condition;

the plurality of start time buttons corresponding to said plurality of subject buttons for selecting a subject such that each subject button has an associated start time button, and wherein said start time buttons are initially set to a value of zero elapsed time, and wherein selection of a start time button by a user input to the device via the selection mechanism causes the start time button thus selected to track and display the elapsed time for the corresponding subject since said start time button was selected; and the plurality of observation buttons corresponding to pre-defined and different observation data established by a user wherein selection of an observation button by a user input to the device via the selection mechanism causes the observation button thus selected to record in the output file the pre-defined and different observation data associated with the observation button thus selected and the elapsed time when the observation button was selected as measured by the time start button associated with the subject button in the ON condition, so that a plurality of observations can be recorded for each subject during the same study by selecting the subject button for that subject so that it is set to the ON condition and then selecting the observation button for the observed data for that subject;

upon selection of the start time button by the user input to the device via the selection mechanism, displaying on the start time button thus selected the elapsed time for the corresponding a subject since said start time button was selected; and upon selection of the observation button by the user input to the device via the selection mechanism, recording in the output file the pre-defined observation data associated with the observation button thus selected and the elapsed time when the observation button was selected as measured by the time start button associated with the subject button in the ON condition.

2. The device of claim 1, further comprising an initiation part wherein said initiation part includes a time synchronization function for synchronizing a plurality of clocks.

3. The device of claim 2, wherein said initiation part includes a description function for describing parameters to characterize a study.

4. The device of claim 1, further comprising a reminder part for setting an alarm at a specified time to notify a user to take a specified action, wherein said reminder part provides a text message and sound at the specified time.

5. A non-transitory computer readable medium storing a program causing a computer to execute a process, the process comprising:

displaying a plurality of subject buttons, start time buttons, and observation buttons within a graphical user interface displayed on a display of a device;

displaying the plurality of subject buttons for selecting a subject for which observation data will be recorded wherein said subject buttons have an ON condition and an OFF condition responsive to a user input to the device via a selection mechanism such that when a subject button is selected it is sot to the ON condition and all other subject buttons are set to the OFF condition;

displaying the plurality of start time buttons corresponding to said plurality of subject buttons for selecting a subject such that each subject button has an associated start time button, and wherein said start time buttons are initially set to a value of zero elapsed time, and wherein selection of a start time button by a user input to the device via the selection mechanism causes the start time button thus selected to track and display the elapsed time for the corresponding subject since said start time button was selected;

displaying the plurality of observation buttons corresponding to pre-defined and different observation data established by a user wherein selection of an observation button by a user input to the device via the selection mechanism causes the observation button thus selected to record in the output file the pre-defined and different observation data associated with the observation button thus selected and the elapsed time when the observation button was selected as measured by the time start button associated with the subject button in the ON condition, so that plurality of observations can be recorded for each subject during the same study by selecting the subject button for that it set to the ON condition and then selecting the observation button for the observed data for that upon selection of the start time button by the user input to the device via the selection mechanism, displaying on the start time button thus selected the elapsed time for the corresponding subject since said start time button was selected; and upon selection of the observation button by the user input to the device via the selection mechanism, recording in the output file the pre-defined observation data associated with the observation button thus selected and the elapsed time when the observation button was selected as measured by the time start button associated with the subject button in the ON condition.

* * * * *